United States Patent [19]

Briant et al.

[11] Patent Number: 5,023,810
[45] Date of Patent: Jun. 11, 1991

[54] IMAGE LABEL UPDATING DEVICE USING SERIALLY CONNECTED MODULES

[75] Inventors: Geoffrey M. Briant; Alistair McDonald; Peter Cockings; Vijay Dhokia, all of Hertfordshire, England

[73] Assignee: British Aerospace Public Limited Company, London, England

[21] Appl. No.: 497,764

[22] Filed: Mar. 20, 1990

Related U.S. Application Data

[63] Continuation of Ser. No. 292,062, Dec. 30, 1988, abandoned.

[30] Foreign Application Priority Data

Dec. 31, 1987 [GB] United Kingdom ................. 8730363

[51] Int. Cl.$^5$ .................... G09G 1/00; G06F 15/00
[52] U.S. Cl. ................... 364/518; 340/800; 365/230.01
[58] Field of Search ............... 364/518, 521; 340/747, 340/750, 798–800; 365/230, 230.01, 230.03, 221

[56] References Cited

U.S. PATENT DOCUMENTS

| | | | |
|---|---|---|---|
| 4,628,305 | 12/1986 | Ikeda | 340/799 X |
| 4,644,502 | 2/1987 | Kawashima | 340/800 X |
| 4,755,814 | 7/1988 | Olsen | 340/799 |
| 4,812,836 | 3/1989 | Kurakake et al. | 340/799 X |
| 4,835,527 | 5/1989 | Hersh | 340/799 X |

Primary Examiner—Heather R. Herndon
Attorney, Agent, or Firm—Cushman, Darby & Cushman

[57] ABSTRACT

A device for making adjustments to the label values of objects within an image being processed. The device, which receives a train of digital signals, identifies signal values within the train which are to be modified, and makes the appropriate modifications. The device comprises a multiple-route shift register arrangement which receives the train of signals and compares these values of each with a series of 'to be corrected' values and, on detection of correspondence, replaces them with 'correction' values in a third series.

8 Claims, 3 Drawing Sheets

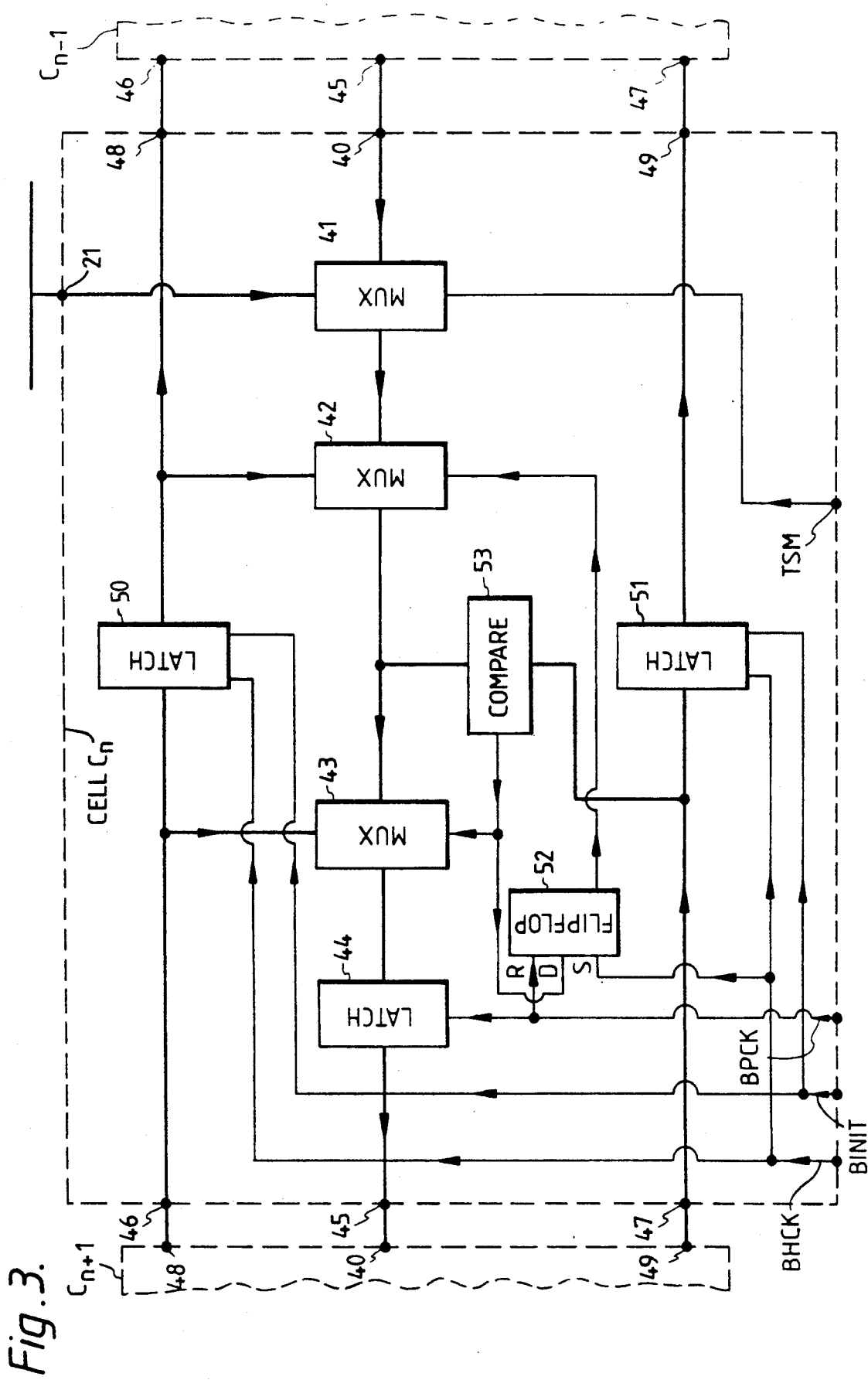

IMAGE LABEL UPDATING DEVICE USING SERIALLY CONNECTED MODULES

This is a continuation of application Ser. No. 07/292,062, filed Dec. 30, 1988, which was abandoned upon the filing hereof.

BACKGROUND OF THE INVENTION

This invention relates to a digital signal processing device which is operable for receiving a stream of digital signals, for locating signals within the stream which are required to be modified, and for making the appropriate modifications. More particularly, but not exclusively, the invention relates to a device, suitable for use in image processing apparatus, which is operable for receiving a stream of digital signals representative of initial label values assigned to different objects within a viewed scene and for correcting the label values to take account, for example, of the perception of additional objects within the scene, or the perception that what was previously perceived to be two objects are in fact the same. The invention also relates to image processing apparatus including such a device.

SUMMARY OF THE INVENTION

According to one aspect of the invention, there is provided a digital signal processing device comprising:

a plurality of first storage elements for storing respective ones of a plurality of first digital signals;

a plurality of second storage elements for storing respective ones of a plurality of second digital signals;

a plurality of third storage elements connected in series for receiving a stream of third digital signals, for storing respective ones of the third signals and for passing each stored third signal on to a next adjacent storage element in the series of stored elements for the stream to be shifted through the series;

comparison means for sensing correspondence of the values of signals stored by the second and third elements; and switch means controlled by the comparison means for replacing signals stored in the third elements with signals having the values of signals in the first elements.

According to a second aspect there is provided image processing apparatus comprising computer means for identifying and labelling those elemental portions of an image of a viewed scene of which are comprised objects within the scene, and for initiating correction of the labelling applied to said portions, the apparatus further comprising a digital signal processing device according to the first aspect of the invention, which device is connected to the computer means and is operable for carrying out said correction.

BRIEF DESCRIPTION OF THE DRAWINGS

For a better understanding of the invention reference will now be made, by way of example, to the accompanying drawings, in which:-

FIG. 3 is a simplified circuit diagram of one of a series of register cells forming part of a number correction device used in the FIG. 1 system.

DESCRIPTION OF THE PREFERRED EMBODIMENT

Figure 1:
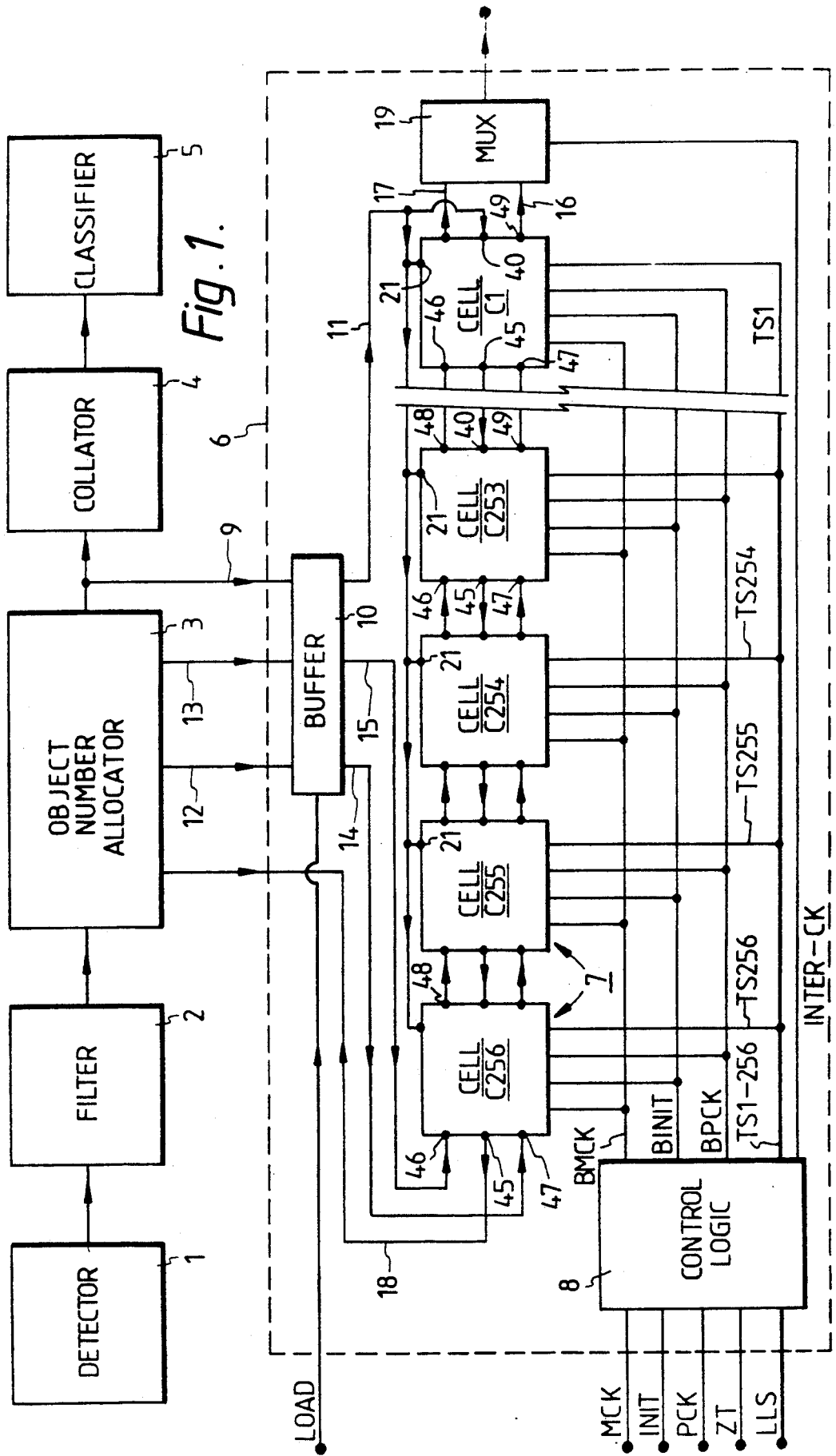
FIG. 1 is a block diagram of part of an image detection and processing system.

Block 1 in FIG. 1 is representative of detection apparatus which forms a digitised video signal corresponding to a scene viewed by the apparatus. The content of the block is not shown but, by way of example, it might include a TV camera, an image sensor of the kind in which there is one or more photo-detector elements and an optomechanical scanning mechanism, or a sensor in the form of a two-dimensional 'staring' array of photo-detector elements. The Block 1 also comprises any necessary drive electronic circuitry for the chosen form of image sensor, any necessary signal conditioning circuitry (for example, in the case of a staring array, circuits to compensate for any mismatch of the characteristics of the different photo-detector elements), and finally also an analog to digital conversion system for receiving the analog video signal from the sensor and converting it into a stream of digital signals each representative of a respective picture element (pixel) of the viewed scene.

The stream of digital signals from the detection apparatus 1 is passed to image processing equipment represented by the blocks 2, 3, 4 and 5 in FIG. 1, each block carrying out or representing a particular process function to be described. In other words, the blocks 2, 3, 4 and 5 may or may not represent respective hardware items. Thus, the processing equipment could comprise a non-distributed non-parallel computer system with a single central processing unit in which case the blocks 2, 3, 4 and 5 represent functions carried out in succession by the system. Alternatively, it may comprise a distributed system in which case the blocks 2, 3, 4 and 5 may represent respective computer processor units, or the functions represented by say two of the blocks may be carried out by one processor unit of a distributed computer system and so on. Also, of course, instead of a computer system in the usual sense of the term, any one or more of the blocks may be implemented as a dedicated item of electronic hardware. As will be described, the block 6 in FIG. 1 is such a dedicated item provided to assist in the carrying out of the function performed or represented by block 3.

For the purposes of the following description, it will be assumed that blocks 2, 3, 4 and 5 are representative of functions carried out in succession by any suitable form of overall computer system.

Initially, the digital pixel signals received from the detection apparatus 1 are stored and those stored signals making up one image frame are subjected to a filtering operation (block 2) in order to distinguish features of possible interest called 'objects' appearing within the viewed scene from their background.

This involves taking each pixel signal in turn and calculating a predetermined mathematical filter function involving the value of that pixel signal and the values of the signals representing the neighbouring pixels, the result of the calculation being a determination of whether that pixel is 'object' or 'background'. Various filter functions have been proposed, some common ones being the so-called Laplacian filter, the Compass gradient filter, the Variance filter and the Contrast Box filter. These terms will be known and understood by those skilled in the art. The overall result of the filtering operation is a set of stored signals, one for each pixel, and each having one or the other of two possible values dependent upon whether the relevant pixel is determined to be object or background-hence this set is called a 'binary image'.

Usually the binary image will contain more than one object and, before each can be analysed, the pixels associated with any one object are labelled with an identifier value unique to that object. This is the function represented by block 3, i.e. object number allocation. This function will be further described later but its overall result is a set of stored signals, one for each pixel, with those signals which are associated with object pixels having respective values assigned in dependence upon which object the pixel belongs to. If this set of signals were to be displayed as an image, that image might appear as shown in FIG. 3, i.e. comprising a series of objects A, B, C, D and E with each of the pixels making up object A assigned the value one, all the pixels making up object B assigned the value two and so on.

Having labelled the objects appearing in the viewed scene, the next function (block 4) is to carry out a series of tests on each object and to collate the test results, say in the form of a series of look-up tables one for each object. The actual form of the tests depend upon the chosen discriminants which will be used to determine whether or not an object really is of interest but, by way of example, might include say a comparison of the overall size of the object with some pre-set value-such choices are a matter of the knowledge of those skilled in the art as also is the particular nature of the classification function (block 5) shown in FIG. 1 which, in general terms only, consists of taking the test results generated at Block 4 and identifying the relevance and nature of each object.

Figure 2:
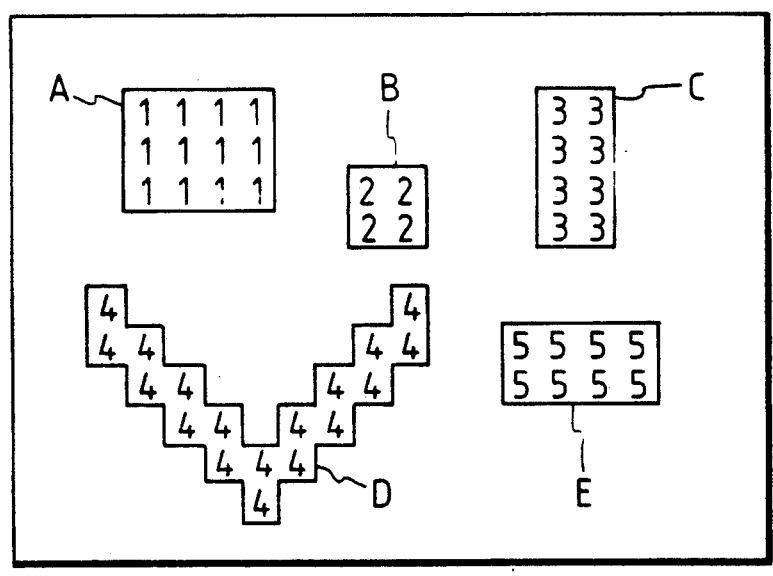
FIG. 2 is a diagrammatic image representation for use in explaining the performance of object number allocation which is one of a series of functions making up the image processing carried out by the FIG. 1 system.

Referring now to FIG. 2, for the object number allocation function, the stored binary image signals made available by the filtering operation are accessed pixel by pixel within each line of the frame and line by line through the frame. The first signal accessed might be that associated with the top left hand pixel of FIG. 2, then the next pixel to the right in the same line and so on. When the first object pixel is read, this being the top left hand pixel making up object A in the present case, an object number label of value one is assigned to that pixel. The next three pixels read are object pixels and are contiguous with the first one read and with each other so these clearly relate to he same object and correspondingly are given a label value of one. After that, some background pixels are accessed and then the top left pixel of object C. Because of the intervening background pixels, this top left pixel of object C is assumed to be associated with a different object and so is assigned a higher label value, i.e. three.

The next pixel is also an object pixel and so this is also assigned the label value three. The function continues in this manner, pixel by pixel and line by line as mentioned earlier. The positions of the objects are noted as they are found so that, for example, when object B is found, it is not mistaken for part of object C. A problem may occur however with v-shaped object D which should have all its pixels labelled with the value four as shown but which, initially, will have its two limbs seen as two separate objects and will be labelled as such. Naturally, the incorrect numbering is not allowed to remain. Rather, the number allocation function includes a sub-function by which the errors are detected and corrected as soon as they become apparent. For example, in the case of the V-shaped object D, once the pixels in line 12 (the conjunction of the V-shape limbs) are labelled, there will be sensed a mismatch between these pixels and those just above them in the right hand limb. As with the other functions of the system, the particular details of the number allocation, especially the manner of detecting initial errors, are known to those skilled in the art. However it is done though, the usual result is that large numbers of corrections have to be made as the function is performed, i.e. when each error is detected, the processor has to return to one or more already accessed pixel lines and renumber the pixels of the or each such line as appropriate. As different errors appear in progression any one line may need to have its pixels relabelled several times. As will be appreciated, this may well involve very significant amounts of processor time.

In particular, whilst the processor carrying out the object number allocation may readily have available the 'wrong' label sequence for a pixel line and can calculate the 'corrected' label sequence, very significant amounts of processor time can be taken up by the need to access each pixel storage location in turn and read into it the corrected value. To save at least some of this time, the object number correcting device (block 6 in FIG. 1) is provided. This device comprises a complex shift register 7 made up of a series of stages or 'cells' C1 to C256 and controlled by a logic circuit 8. The number of cells is equal to the number of pixels in each line of the image to be processed, i.e. two hundred and fifty six in the illustrated example. Note that FIGS. 2 and 3 each show only twenty pixels to a line but these figures are only to assist in understanding the number allocation function. Two hundred and fifty six pixels per line is a much more likely figure in practice.

The shift register 7 of the number correcting device was said to be complex because in effect it comprises three parallel shift routes each capable of receiving a train of multiple-bit digital signals. Further, the shifting is in one direction through one of these routes (called the central route) and in the opposite direction in the other two. Each cell C1-C256 comprises one stage of each of the three shift routes.

When a label value correction is to be made, say when the merge of two parts of an object, previously appearing as two separate objects (such as the two limbs of v-shaped object D in FIG. 2), is detected, the relevant 'wrong' label value and the correct value are shifted into respective ones of the two outer shift register routes through buses 12 and 13. Thus, when the merge of the limbs of object D is detected, the values four and five respectively would be entered into cell C256 via buses 12 and 13.

Meanwhile, each 'initial' line sequence of pixel label values (to be corrected) are sent via bus 9, controllable buffer circuit 10 and bus 11 into the central shift route at cell C1.

As the initial sequence shifts through the register, comparators in the cells detect each correspondence between an 'initial' sequence label value and an 'old' sequence label value and initiate the replacement of such 'initial' sequence label values with the corresponding label values from the 'new' sequence. Each detected merge produces a new pair of 'wrong' and 'correct' label values which are shifted into the relevant registers, the previously entered value pairs shifting along to make room for them. Thus, several different corrections may be made to each initial label sequence as it passes through the central register.

Eventually the corrected initial sequence emerges on bus 18 from cell C256 and is fed back to the processor carrying out the number allocation function (block 3).

As will be seen, the buses 16 and 17 lead to the two inputs of a multiplexer 19 which has a changeover input fed with a clock signal from the control circuit 8 and an output 20. The multiplexer has no function during normal operation of the system, the 'old' and 'new' label value sequences being simply lost once they have done their work at this time. It will be appreciated however that the device 6, especially if it is implemented as a large or very large scale integrated circuit (LSI or VLSI), will need to be tested after manufacture. One such test can comprise shifting digital signal sequences through the 'old' and 'new' sequence routes and reading the merged sequences at the multiplexer output—by way of example, this will check on the continuity of the shift register routes.

It will be seen also that the bus 11 is not just connected to cell C1 but is also parallel connected to respective auxilliary inputs 21 of all the other cells. Via control lines TS1 to TS256 from control circuit 8, any one of the cells C1 to C256 can be enabled to receive the 'initial' label value sequence via its auxilliary input, i.e. so that this auxilliary input forms an alternative entry point to the central shift register route. This facilitates the correction of 'short' lines of pixels—note that the image processing system may well be operable, perhaps after an initial whole image analysis, to process and further analyse only a portion of the whole frame. In connection with this feature, it will be realised that the auxilliary input to the first cell C1 and the auxilliary inputs to the last few cells, especially C256, are somewhat irrelevant. They are provided however because they are used when initialising the central register and loading initialisation data. In any case, it is preferred to have every cell identical in construction and identically connected. For example, it then becomes possible to implement the shift register as a plurality of identical integrated circuit chips each comprising say sixteen cells-the chips can then be incorporated into the overall device in any order. Even if all the cells are implemented on a single VLSI chip, it is still advantageous for manufacturing purposes to have them all identical.

The control circuit 8 receives as selection input signals, generated by separate means (not shown) or the computer which carries out the functions of blocks 2 to 5, a line length selection signal LLS which is used to generate a signal on the appropriate one of lines TS1-256, a zero tap signal ZT which simply zeroises the signal on lines TS to disable all the cell auxilliary inputs and hence gives a simple way of switching to full line length processing, an initialise signal INIT which is simply buffered within the control circuit and, as buffered signal BINIT, initialises (i.e. empties) the 'new' and 'old' sequence routes of the shift register, and two out of phase clock signals PCK and MCK, each having a repetition rate equal to the rate at which signals of the 'old', 'new' and 'initial' label value sequences are passed to the device 6. These are simply buffered within the circuit 8 to produce de-phased clock signals BPCK and BMCK which are used to control the shifting of the signals through the shift register signal. BPCK controls the shifting of the initial sequence through the register while signal BMCK, produced only when a merge is detected, shifts new wrong and correct label pairs into and along the outer registers. The signals PCK and MCK are also logically combined within circuit 8 to produce a clock signal INTER-CK for controlling the multiplexer 19. As will be appreciated from the above, the control circuit 8 only carries out relatively simple logic operations and buffer amplification-its design will be well within the scope of those skilled in the art and hence it need not be described further.

One more 'external' control signal is fed to device 6, this being the signal LOAD which is used to select certain initialisation data fixed within an external register or to select the data loaded via the three input data ports (or via the LLS port).

Referring now to FIG. 3, each of the cells C1 to C256 comprises a main input 40 and the previously mentioned auxilliary input 21, these leading to the two inputs of a multiplexer 41 having a changeover control input to which is connected line TSn, i.e. the appropriate one for this cell of the lines TS1 to TS256 from circuit 8. A control signal on this line switches multiplexer 41 so that it passes to its output, the 'initial' sequence of values received either at the normal input 40 (from the output 45 of the preceding cell Cn-1 or from the bus 11 in the case of cell Cl) or that sequence of values as received direct from bus 11 via the auxilliary input 21. The output of multiplexer 41 is connected to a first input of a second multiplexer 42 which has an output connected to a first input of a third multiplexer 43.

The output of multiplexer 43 is coupled to the input of a latch 44 and the output of this latch 44 leads to output 45 of the cell. Output 45 is coupled to the input 40 of the next (higher numbered) cell Cn+1. Thus the path from input 40 through multiplexers 41, 42 and 43 and latch 44 to output 45 forms a portion, within this cell, of the aforementioned 'central' shift route through which the 'initial' label value sequence is passed. The two other routes, i.e. for the 'new' and 'old' sequences, extend between cell inputs 46 and 47 respectively and cell output 48 and 49 via respective latches 50 and 51. The second inputs of the two multiplexers 42 and 43 are connected to the 'new' sequence shift route respectively downstream and upstream of the latch 50.

Each of the latches 50 and 51 receive the control signal BINIT and the clock signal BMCK, this clock signal BMCK being also fed to the set input of a set/reset bistable circuit (D-flip-flop) 52. Clock signal BPCK is fed to the reset input of flip-flop 52 and to a control input of latch 44. The set output of Q flip-flop 52 is fed to the changeover control input of multiplexer 42. The D input of the flip-flop receives its signal from the output of a comparator 53. The comparator 53 has two comparison inputs, one connected to receive the the signal appearing between the output of multiplexer 42 and the first input of multiplexer 43, and the other connected to the input of latch 51. Comparator 53 also feeds its output to the changeover control input of multiplexer 43.

At the rising edge of each pulse of the clock signal BPCK, the signal appearing at the input of latch 44 is latched in so as to become available at its output so that, at any time, one label value in the initial sequence is present at the output 45 of the illustrated cell Cn while the next subsequent value in the sequence is present at the output 45 of the preceding cell Cn-1 and hence at the input 40 of cell Cn. Assuming each of the multiplexers 41, 42 and 43 are set to pass the signals appearing at their first inputs, the same next label value (from cell Cn-1) is passed through to the input of latch 44 and, at the next pulse of clock signal BPCK, is latched in. As the clock signal pulses continue to arrive, the 'initial' label value sequence is thus shifted through from cell to cell. Meanwhile, in response to the rising edges of the pulses of clock signal BMCK, when it is supplied, the label values of the 'old' and 'new' sequences are latched in succession into the latches 50 and 51. As this occurs, comparisons are made by comparator 53 between the values of the 'old' sequence and those of the initial sequence and, upon detection of correspondence between values of these two sequences, the multiplexers 42 and 43 are switched so as to achieve replacement of the relevant value in the 'initial' sequence by the appropriate value in the 'new' sequence.

The flip flop 52 is cleared on the rising edge of the BPCK so that multiplexer 42 routes the initial sequence present at the output of multiplexer 41. The comparator 53 performs comparisons (as described above) between the initial sequence and the 'old' sequence present at the input of latch 51. If there is correspondence between these values, the signal resulting at the output of the comparator 53 controls multiplexer 43 so that it routes the 'new' sequence (at the input of latch 50) through to the input of latch 44.

A pulse of the BMCK signal may occur before the next BPCK pulse. At the rising edge of the bmck pulse the old and new sequence label values are latched through the latches 50 and 51 and the multiplexer 42 routes the output of latch 50 if the 'new' sequence was routed through multiplexer 43 after the last pulse of BPCK.

We claim:

1. A digital signal processing device comprising:
   a plurality of first storage elements connected in series for storing respective ones of a plurality of first digital signals representing old information from a signal source which is to be replaced;
   a plurality of second storage elements connected in series for storing respective ones of a plurality of second digital signals representing new information from said signal source which is to replace said old information;
   a plurality of third storage elements connected in series to form a series of third elements for receiving a stream of third digital signals representing current information, for storing respective ones of the third signals and for passing each stored third signal on to a next adjacent storage element in the series of third elements so the stream of signals is shifted through the series of third elements;
   comparison means connected to said first and third storage elements for sensing correspondence of values of signals stored by the first and third elements to determine that said current information represents old information; and
   switch means, controlled by the comparison means and connected to said second and third storage elements, for changing values of said third digital signals stored in the third elements to have the values of said new information in the second elements when a correspondence is detected.

2. An apparatus as in claim 1 wherein said first and second digital signals are respectively passed and shifted through the series one to the next.

3. An apparatus as in claim 2 wherein said third digital signals are shifted in a first direction through the series of third storage elements, and said first and second digital signals are shifted in an opposite direction through the first and second storage elements.

4. An apparatus as in claim 1 wherein said switch means is a multiplexer, a control line of which is controlled by an output of said comparison means.

5. An image-processing apparatus comprising:
   image labeling means for identifying and labeling portions of an image of a viewed scene which comprise objects of the scene; and
   means for correcting labeling applied to said objects when such correction becomes necessary comprising:
   a plurality of first storage elements connected in series for storing respective ones of a plurality of first digital signals representing new information from said image labelling means with which a corrected object is to be labeled;
   a plurality of second storage elements connected in series for storing respective ones of a plurality of second digital signals representing old information from said image labelling means which is to be replaced;
   a plurality of third storage elements, connected in series with one another to form a series of third elements and receiving a stream of third digital signals representing current information, for storing respective ones of the third signals and for passing each stored third signal to a next adjacent storage element in the series of third elements to be shifted therethrough;
   comparison means, connected to the second and third storage elements for receiving said second and third digital signals, for sensing a correspondence of values of the signals stored thereby to thereby determine that said third digital signal represents old information which is to be replaced; and
   switch means, controlled by said comparison means determining that a value of said current information is to be replaced, for changing values of said third digital signals to have the values of said first digital signals in the first storage elements when said correspondence is detected.

6. An apparatus as in claim 5 wherein said first and second digital signals are respectively passed and shifted through the series of third elements one to the next.

7. An apparatus as in claim 6 wherein said third digital signals are shifted in a first direction through the series of third storage elements, and said first and second digital signals are shifted in an opposite direction through the first and second storage elements.

8. An apparatus as in claim 5 wherein said switch means is a multiplexer, a control line of which is controlled by an output of said comparison means.

* * * * *